United States Patent [19]
Hameen-Anttila

[11] 3,816,953
[45] June 18, 1974

[54] FISH LURE

[76] Inventor: Yrjo Sakari Hameen-Anttila, Alakiventie 1 C 35, 00920 Helsinki 92, Finland

[22] Filed: Jan. 5, 1973

[21] Appl. No.: 321,240

[30] Foreign Application Priority Data
Sept. 5, 1972    Finland .............................. 2442/72

[52] U.S. Cl. ....................................... 43/35, 43/36
[51] Int. Cl. ........................................... A01k 83/02
[58] Field of Search ............ 43/36, 35, 42.04, 42.41

[56] References Cited
UNITED STATES PATENTS

| | | | |
|---|---|---|---|
| 1,318,073 | 10/1919 | Gottschalk | 43/36 |
| 2,521,555 | 9/1950 | Widmer | 43/35 |
| 2,522,808 | 9/1950 | Adams | 43/35 |
| 2,544,782 | 3/1951 | Fawcett | 43/36 |

FOREIGN PATENTS OR APPLICATIONS

| | | | |
|---|---|---|---|
| 970,920 | 9/1964 | Great Britain | 43/35 |

*Primary Examiner*—Warner H. Camp
*Attorney, Agent, or Firm*—Jay L. Chaskin, Esq.

[57] ABSTRACT

A fish lure with spring loaded hooks, wherein the lure body is provided with a longitudinal cavity extending essentially throughout the whole length of the body and a movable plunger is provided within the cavity and engaged at its front end by a compressible spring resting against the inner end of the cavity. Hooks are pivotally connected to the plunger and may be thrust out through openings in the lure body. The plunger is further provided with a locking member for holding it in the loaded position and at the outside of the lure there is arranged a resilient or spring-loaded trigging member in operational contact with the locking member for releasing the plunger. Preferably the hooks are connected at about the middle of the plunger and swingable through a slot in the plunger, the rear end of the plunger extending in the released position out over the rear end of the lure body so that the plunger may be set under spring load and the hooks withdrawn by simply pushing the plunger into the cavity.

4 Claims, 3 Drawing Figures

3,816,953

FISH LURE

BACKGROUND OF THE INVENTION

1. Field of the Invention

The present invention refers to a fish lure of the type having spring-loaded hooks which may be withdrawn and locked into the lure body and correspondingly released or fired by suitable action upon triggering or releasing means positioned outside the lure body.

2. Description of the Prior Art

There are baits and fish lures previously invented having spring-loaded hooks which are thrust out when released by a trigger. However the mechanism for latching and releasing the hooks in the known solutions is usually either rather ineffective and dangerous or too complicated. For instance there is known a lure of the type described comprising a lure body divided into two collapsible body halves pivotally connected to each other, whereby the lure body must be opened for resetting the spring mechanism.

SUMMARY OF THE INVENTION

The present invention provides a fish lure of the type once described, which offers great simplicity, effectiveness and safety. Said fish lure mainly comprises a lure body with a longitudinal cavity therein, a spring-loaded plunger within said cavity, at least one hook connected to the plunger, means for locking said plunger into the spring-loaded position, wherein said hook is essentially withdrawn into the lure body, and resilient means outside the lure body operationally connected to the locking means for releasing the locking means together with the plunger when being deflected a certain amount from its resting position.

DESCRIPTION OF THE PREFERRED EMBODIMENTS

Figure 1:
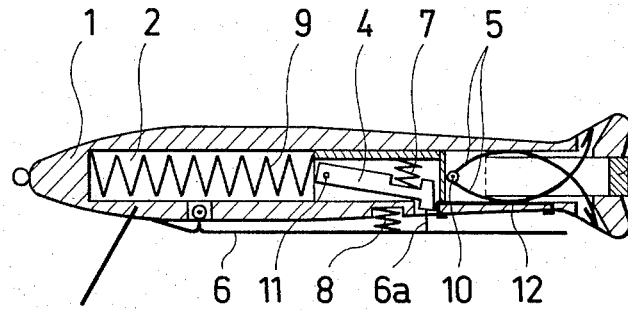
FIG. 1 is a longitudinal sectional view of the novel fish lure described herein with the hooking means in latched position in the body of the lure.

The novel lure consists of the body 1 and its cavity 2, a plunger 3, a latch 4, two hooks 5, a trigger 6 and its vertical stick 6a, a spring 7 for the latch, a spring 8 for the trigger, a spring 9 for the plunger, a pivot 10 of the hooks, a pivot 11 of the trigger and a support slide 12.

The plunger 3 has a longitudinal slot diametrically disposed for the retracting and thrusting out of the hooks.

FIG. 1 shows the lure with the mechanism in latched position within the body of the lure. The plunger 3 has been pushed in, the hooks 5 attached to the plunger at pivot 10 have been drawn into the body of the lure, the hammer shaped latch 4 attached to the plunger at pivot 11 and loaded by spring 7 is fallen into its notch and latched against the edge of the support slide 12.

Under the body of the lure is the trigger 6 loaded by the spring 8 from the body downward, with its vertical stick 6a ready to raise the hammer shaped latch 4 from its notch to the upper edge of the support slide 12.

Figure 2:
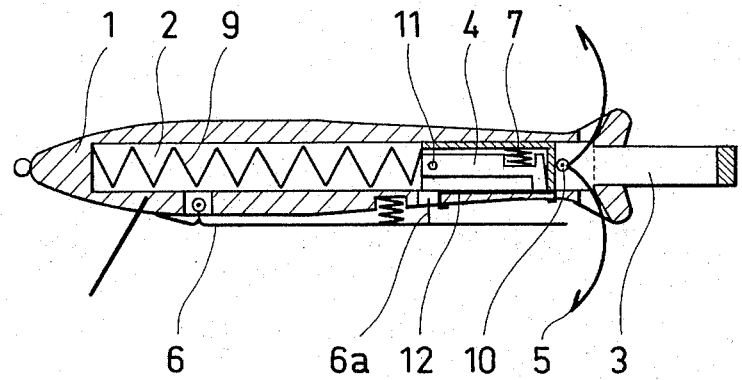
FIG. 2 is a longitudinal sectional view of the same novel fish lure with the hooking means extended from the body of the lure.

FIG. 2 shows the mechanism released: the vertical stick 6a of the trigger 6 has raised the hammer shaped latch 4 to the upper edge of the support slide 12 and the spring 9 has thrust the plunger 3 back along the support slide 12 and the hooks 5 attached to the plunger 3 at pivot 10 are thrust out.

Figure 3:
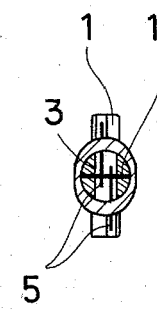
FIG. 3 is a tranverse sectional view taken on the pivot of the hooks.

FIG. 3 is a transverse sectional view at the pivot 10 of the hooks. There are seen the body 1, the plunger 3, the hooks 5 in their slot and their pivot 10.

This invention possesses the advantage that the latching of the hooks 5 within the body 1 of the lure is simple, effective and safe. By pushing the plunger 3 into the body of the lure the latch has a tenable base in a notch against the fore-edge of the support slide. The hooks are thrown out only by pushing the trigger 6 upwards allowing the plunger to slide back along the upper edge of the support slide the plunger remaining pushed out by its spring and the hooks remaining in their thrown-out position.

To retract the hooks the plunger 3 must be pushed back into the body of the lure. Loosening of the trapped fish can be done safely by pushing the plunger through the gills of the fish. If the device is constructed of moldable material, as plastic, the cavity in the body housing and the mechanism may be formed by constructing the body of two complimentary and symmetrical halves and joined together by any convenient means. Such a lure is durable and inexpensive to build.

It is understood that the present invention is not limited to the embodiment described and shown in the drawing. In particular, it includes all means that constitute technical equivalence of the various elements and means described and shown, as well as their combination, if they are within the scope of the appended claims.

What is claimed is:

1. A fish lure comprising
  a lure body with a longitudinal cavity therein open at a rear end of the lure body;
  a spring-loaded plunger slidable within said cavity and projecting in its released position out through the open rear end of the lure body cavity, the plunger being placed in its spring-loaded position by pushing the projecting plunger into the cavity;
  at least one hook connected to the plunger;
  a locking member pivotably connected at a first end to the plunger to retain the plunger in the spring-loaded position wherein said hook is withdrawn into the lure body, a second end of the locking member being engageable with stopping means in the lure body;
  a support slide disposed within the cavity to form a slide surface for the disengaged second end of the locking member; and
  trigger means on the exterior of the lure body for disengaging the locking member through an opening in the lure body and thereby releasing the plunger from the spring-loaded position.

2. A fish lure according to claim 1, comprising two hooks pivotally connected to the plunger to be thrust out essentially in opposite directions when said locking means is released.

3. A fish lure according to claim 1, comprising a helical compressible spring in the inner end of said cavity in front of the plunger.

4. A fish lure according to claim 1 wherein the trigger means comprises a resilient longitudinal member pivotably connected at one end to the lure body and having a projection extending into a lure body opening for contacting said second end of the locking member, said opening constituting the stopping means.

* * * * *